United States Patent
Noessing et al.

(10) Patent No.: US 7,184,543 B2
(45) Date of Patent: Feb. 27, 2007

(54) METHOD AND CIRCUIT ARRANGEMENT FOR CONTROLLING A SUBSCRIBER LINE INTERFACE CIRCUIT

(75) Inventors: Gerhard Noessing, Villach (AT); Herbert Zojer, Villach (AT)

(73) Assignee: Infineon Technologies AG, Munich (DE)

( * ) Notice: Subject to any disclaimer, the term of this patent is extended or adjusted under 35 U.S.C. 154(b) by 61 days.

(21) Appl. No.: 10/639,357

(22) Filed: Aug. 12, 2003

(65) Prior Publication Data

US 2004/0071283 A1    Apr. 15, 2004

(30) Foreign Application Priority Data

Aug. 30, 2002 (DE) .................. 102 40 810

(51) Int. Cl.
*H04M 19/00* (2006.01)
(52) U.S. Cl. ............. 379/399.02; 379/413; 379/207.15
(58) Field of Classification Search ........... 379/399.02, 379/207.15, 413
See application file for complete search history.

(56) References Cited

U.S. PATENT DOCUMENTS

| | | | |
|---|---|---|---|
| 4,709,388 A | * | 11/1987 | Defretin ............... 379/413 |
| RE35,582 E | | 8/1997 | Pariani et al. |
| 6,590,977 B1 | * | 7/2003 | Taguchi ............... 379/399.01 |
| 6,687,348 B2 | * | 2/2004 | Cromer et al. ......... 379/102.04 |
| 6,697,482 B1 | * | 2/2004 | Martinez Acedo et al. ...... 379/373.03 |

FOREIGN PATENT DOCUMENTS

WO    WO 99/27703    6/1999

OTHER PUBLICATIONS

German Office Action dated Jun. 6, 2003.

* cited by examiner

*Primary Examiner*—Daniel Swerdlow
(74) *Attorney, Agent, or Firm*—Jenkins, Wilson, Taylor & Hunt, P.A.

(57) ABSTRACT

The invention provides a method for controlling a subscriber line interface circuit, which is connected to at least one data line and to at least one subscriber line associated with a subscriber, in the on-hook state, having the following steps: on-hook data transmission signals are detected in the data line; if an on-hook data transmission signal intended for the subscriber (102) is detected in the data line (122), the detected on-hook data transmission signal is buffer-stored and the subscriber line interface circuit (106) is switched from a passive operating mode to an active operating mode; the buffer-stored detected on-hook data transmission signal is transmitted by the subscriber line interface circuit (106) in the subscriber line (104) to the subscriber (102); and the subscriber line interface circuit (106) is switched to the passive operating mode. The invention also provides a circuit arrangement for carrying out the method.

13 Claims, 2 Drawing Sheets

METHOD AND CIRCUIT ARRANGEMENT FOR CONTROLLING A SUBSCRIBER LINE INTERFACE CIRCUIT

TECHNICAL FIELD

The present invention relates to a method and a circuit arrangement for controlling a subscriber line interface circuit, which is connected to at least one data line and to at least one subscriber line, in the on-hook state.

BACKGROUND ART

A telephone system generally has a telephone switching system (Telephone Central Office) or an exchange and one or more subscriber terminals which are connected to the telephone switching system by means of a respective subscriber line. The subscriber terminals can be telephones or other telephone equipment. The subscriber line generally has two conductors or two wires which are referred to as the "tip" (a-wire) and the "ring" (b-wire). The tip wire and the ring wire transport both AC signals and DC signals. The subscriber terminal together with the associated tip and ring wires is generally referred to as a loop or subscriber loop (SL).

The telephone switching system handles the switching of telephone signals between subscriber terminals. Industrial standards, such as Telcordia (Bellcore) Technical Reference TR-NWT-00057, Functional Criteria for Digital Loop Carrier (DLC) Systems, Issue Jan. 2, 1993, determine the electrical signal levels which are used for switching, connecting and signaling within the telephone system. If, by way of example, a telephone call to a specific subscriber terminal is requested, the telephone switching system needs to transmit ringing signals to the telephone terminal in order to signal the incoming call.

The telephone system's telephone switching system normally contains a linecard, a ringing signal generator and a voltage supply for the linecard and the ringing signal generator. The linecard supplies a plurality of subscribers and is normally fitted in the telephone switching system in a rack. For each subscriber, the linecard has a subscriber line interface circuit (SLIC) and a CODEC circuit (coder/decoder circuit).

The subscriber line interface circuit is coupled to a respective subscriber line by means of associated connections on the linecard and is connected to the subscriber by means of the subscriber line. The subscriber line interface circuit is normally connected to the CODEC circuit using four lines, a reception line and a transmission line and two respective associated ground lines. The subscriber line interface circuit (SLIC) couples the analog subscriber line operated at a high voltage to the analog and digital circuits in the CODEC circuit, which are operated at low voltages, and converts the signals transmitted in the four lines connected to the CODEC circuit into a two-wire signal for the subscriber line. The subscriber line interface circuit normally supports the known "BORSHT" functions of battery feed, overvoltage protection, generation of the ringing signal, signaling, coding or PCM-conversion, the conversion between two-wire transmission and four-wire transmission (hybrid) described above, and testing.

The CODEC circuit is normally connected by means of a data transmission line and data reception line to a further connection on the linecard, said further connection being connected to a data line. The data line is used to transmit voice information in the voice band using PCM-coded digital signals and information data, for example using FSK-modulated digital signals. The digital signals are decoded by the CODEC circuit and are converted into analog signals for the subscriber line interface circuit.

The reception line between the CODEC circuit and the subscriber line interface circuit normally has a frequency shift keying (FSK) circuit connected to it. In the case of a received telephone call, for example, the FSK circuit generates the telephone number which is to be displayed on the subscriber terminal. The frequency shift keying used in the FSK circuit is frequency modulation which uses two frequencies, one frequency of the two frequencies representing the digital one, while the other frequency of the two frequencies represents the digital zero.

The details relating to transmission of information data via lines are stipulated, by way of example, in the European Telecommunication Standard ETS with the reference No. 300659-1 (PSTN; Subscriber line protocol over the local loop for display (and related) services; Part 1 On hook transmission) from ETSI. The information data are transmitted in the voice band of a line using the aforementioned FSK modulation. For FSK modulation, the stipulations from ITU-T V.23 for the forward channel at a baud rate of 1200 bauds apply, for example. Depending on the purpose of the information, the information data can be transmitted both in the respective subscriber terminal's call state, i.e. before a signaled, incoming directed call is taken, and in the subscriber terminal's connected state. In terms of a loop resistance of the subscriber loop which contains the subscriber line and the subscriber terminal, the call state is equivalent to the quiescent state. Since, in the quiescent state, the subscriber terminal's receiver is generally seated on the hook, the term "on-hook" is used for this. In the connected state, a subscriber terminal's receiver has been lifted from the hook, and hence ETS stipulates the term "off-hook" for this. In a subscriber loop's on-hook state, information data such as the telephone number of the calling subscriber are transmitted, as mentioned above. The FSK signals which transmit these information data are referred to herein as on-hook data transmission signals.

In DLC (Digital Loop Carrier) systems, the power loss in the on-hook state of the subscriber loop is of great significance, since these systems are frequently powered remotely by supply devices, are positioned independently and need to maintain the telephone service during mains failure, for example (Life Line Support). In the case of conventional linecards and subscriber line interface circuits used in such DLC systems, for example, the power loss is normally accepted in the on-hook state, however, and the subscriber line interface circuit is left in an active operating mode, for example, in the on-hook state.

To reduce the power loss of linecards and subscriber line interface circuits, other known solutions provide a dedicated power-loss reducing on-hook operating mode in the subscriber line interface circuit. However, if a subscriber line interface circuit is operated in this on-hook operating mode, this results in a poorer transmission response when transmitting on-hook data transmission signals, on account of the lower power available for data transmission.

SUMMARY OF THE INVENTION

The object of the present invention is to provide a method and a circuit arrangement for controlling a subscriber line interface circuit which, in the subscriber loop's on-hook state, allow both a reduction in the power loss of a subscriber line interface circuit and a good transmission response in a subscriber line.

This object is achieved by a method in accordance with claim 1 and by a circuit arrangement in accordance with claim 5.

If no information data are being transmitted via a subscriber line in a subscriber loop's on-hook state, the subscriber line interface circuit can be operated in a passive or disconnected operating mode (power down mode), with monitoring of the line current requiring only a very simple circuit. In the passive operating mode, it is not possible to transmit on-hook data transmission signals, however, since the line drivers in the subscriber line interface circuit have been deactivated in order to reduce the power loss.

The idea underlying the invention is now to keep the subscriber line interface circuit in a passive operating mode until on-hook data transmission signals actually need to be transmitted, since on-hook data transmission signals are normally not transmitted constantly, but rather just sporadically. This requires on-hook data transmission signals to be identified, buffer-stored, the subscriber line interface circuit to be switched from a passive operating mode to an active operating mode, and only then the on-hook data transmission signals to be transmitted. The resultant additional delay through buffer-storage can be tolerated. This is compatible with the Telcordia Recommendation GR30 CORE standard, Issue 2, December 1998.

The invention relates to a method for controlling a subscriber line interface circuit, which is connected to at least one data line and to at least one subscriber line associated with a subscriber, in the on-hook state, having the following steps: on-hook data transmission signals are detected in the data line; if an on-hook data transmission signal intended for the subscriber is detected in the data line, the detected on-hook data transmission signal is buffer-stored and the subscriber line interface circuit is switched from a passive operating mode to an active operating mode; the buffer-stored detected on-hook data transmission signal is transmitted by the subscriber line interface circuit in the subscriber line to the subscriber; and the subscriber line interface circuit is switched to the passive operating mode.

The invention also relates to a circuit arrangement for controlling a subscriber line interface circuit, which is connected to at least one data line and to at least one subscriber line associated with a subscriber, in the on-hook state, having a memory, a detector for detecting on-hook data transmission signals in the data line and, if an on-hook data transmission signal intended for the subscriber is detected in the data line, for buffer-storing the detected on-hook data transmission signal in the memory; and a controller for switching the subscriber line interface circuit from a passive operating mode to an active operating mode if the detector detects an on-hook data transmission signal intended for a subscriber in the data line and for switching the subscriber line interface circuit from the active operating mode to the passive operating mode if the buffer-stored detected on-hook data transmission signal has been transmitted by the subscriber line interface circuit in the subscriber line to the subscriber.

The subclaims contain advantageous developments and improvements of the method specified in claim 1 and of the circuit arrangement specified in claim 5.

In line with one preferred development of the method, the passive operating mode is an operating mode in which the subscriber line interface circuit is off.

In line with another preferred development of the method, the detected on-hook data transmission signal is buffer-stored until the subscriber line interface circuit has stabilized after being switched from the passive operating mode to the active operating mode.

In line with another preferred development of the method, the step of detecting on-hook data transmission signals in the data line involves the on-hook data transmission signals additionally being decoded, and the step of transmission involves the buffer-stored detected on-hook data transmission signal additionally being coded.

In line with one preferred development of the circuit arrangement, the circuit arrangement additionally has a transmitter which, under the control of the controller, reads the buffer-stored on-hook data transmission signal from the memory and transmits it to the subscriber line interface circuit.

In line with another preferred development of the circuit arrangement, the detector decodes detected on-hook data transmission signals before buffer-storage, and the transmitter codes a buffer-stored on-hook data transmission signal before transmission.

In line with another preferred development of the circuit arrangement, the detector is an FSK (Frequency Shift Keying) detector, and the transmitter is an FSK transmitter.

In line with another preferred development of the circuit arrangement, the memory has a direct access memory (RAM; RAM=Random Access Memory).

In line with another preferred development of the circuit arrangement, the circuit arrangement is arranged in a coder/decoder circuit which connects the data line to the subscriber line interface circuit.

In line with another preferred development of the circuit arrangement, the passive operating mode is an operating mode in which the subscriber line interface circuit is off.

In line with another preferred development of the circuit arrangement, the detected on-hook data transmission signal is buffer-stored until the subscriber line interface circuit has stabilized after being switched from the passive operating mode to the active operating mode.

One advantage of the present invention is that it allows a very great reduction in the power loss and hence in the loading of the supply devices for a linecard or for a subscriber line interface card in the on-hook state of a subscriber loop.

BRIEF DESCRIPTION OF THE DRAWINGS

Preferred exemplary embodiments of the present invention are explained in more detail below with reference to the appended drawings, in which.

DETAILED DESCRIPTION OF THE INVENTION

Figure 1:
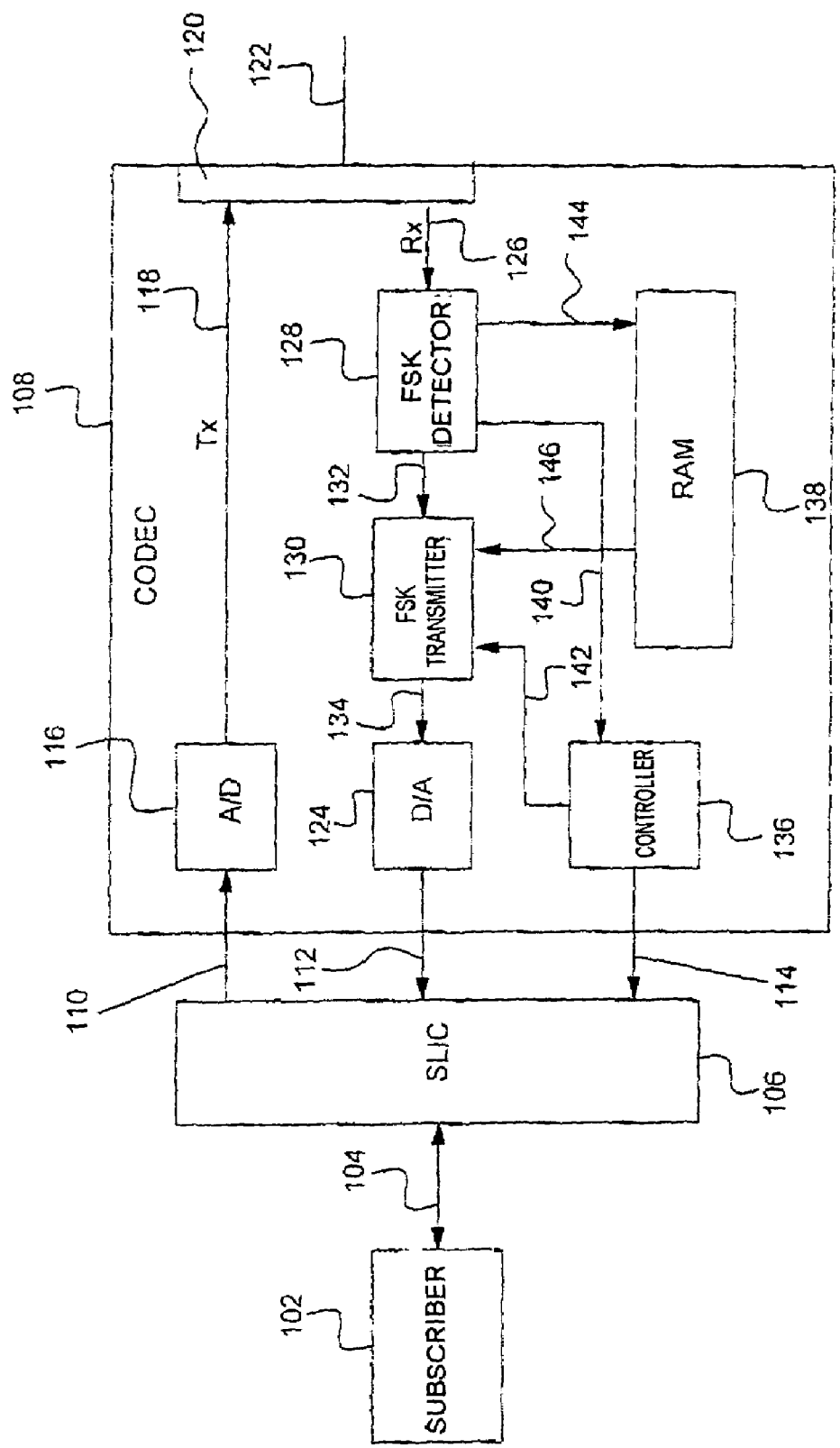
FIG. 1 shows an exemplary embodiment of a circuit arrangement for controlling a subscriber line interface circuit in accordance with the invention.

FIG. 1 shows an exemplary embodiment of a circuit arrangement for controlling a subscriber line interface circuit in accordance with the invention. A subscriber 102 is connected to a subscriber line interface circuit 106 by means of a subscriber line 104. The subscriber line interface circuit (SLIC) 106 can have a plurality of subscribers connected to it by means of respective subscriber lines. The subscriber line interface circuit 106 is connected to a CODEC circuit 108 by means of a transmission line 110, a reception line 112 and a control line 114. The CODEC circuit 108 has an analog/digital (A/D) converter 116 which is connected to the transmission line 110 and converts analog transmission signals therein into digital transmission signals in a data transmission line 118. The data transmission line 118 is connected to a connection 120 on the CODEC circuit 108, said connection having a data line 122 connected to it for transmitting digital data. The CODEC circuit 108 also has a digital/analog (D/A) converter 124 which is connected to the reception line 112 and converts digital reception signals in a data reception line 126, which is likewise connected to the connection 122, into analog reception signals in the reception line 112. In the data transmission line 118, preferably PCM-coded (PCM=Pulse Code Modulation) digital transmission signals for voice transmission and, at the same time, information data in the form of FSK-modulated digital transmission signals can be transmitted to the connection 120 and subsequently to the data line 122. In the data reception line 126, PCM coded digital reception signals and FSK modulated reception signals can accordingly be received from the data line 122 via the connection 120.

Between the digital/analog converter 124 and the data reception line 126, the CODEC circuit 108 of the present invention also has an FSK detector 128 and an FSK transmitter 130 which are connected to one another by means of a link 132. The FSK detector 128 is used to detect on-hook data transmission signals in the form of FSK-modulated digital reception signals in the data line 122 or in the data reception line 126. By contrast, the FSK transmitter 130 is used to transmit FSK modulated digital signals to the D/A converter 124 via a link 134. The CODEC circuit 108 also has a controller 136 and a memory 138. The controller 136 is connected to the FSK detector 128 by means of a link 140 for the purpose of transmitting a detection signal to the controller 136. The detection signal is used to indicate the detection of an FSK modulated digital reception signal by the FSK detector 128. The controller 136 is also connected to the FSK transmitter 130 by means of a link 142 for the purpose of actuating the FSK transmitter 130 and to the subscriber line interface circuit 106 by means of the control line 114 for the purpose of actuating the subscriber line interface circuit 106. The memory 138 is connected to the FSK detector 128 by means of a link 144 for the purpose of storing detected FSK-modulated digital reception signals in the memory 138 and to the FSK transmitter 130 by means of a link 146 for the purpose of reading the FSK-modulated digital reception signals from the memory 138.

In the subscriber loop's off-hook state, the subscriber line interface circuit 106 is operated in an active operating mode, and the digital reception signals are forwarded by the FSK detector 128 via the link 132 directly to the FSK transmitter 130, which forwards the reception signals to the digital/analog converter 124 via the link 134. In the case of the present invention, in the subscriber loop's on-hook state, the subscriber line interface circuit 106 can be operated both in an active operating mode and in a passive or disconnected operating mode (power down mode), in which a minimum amount of energy is consumed.

In the subscriber loop's on-hook state, the subscriber line interface circuit 106 of the present invention is operated in the passive operating mode as standard. If the FSK detector 128 detects FSK modulated digital on-hook data transmission signals in the data reception line 126, the FSK detector 128 stores these on-hook data transmission signals in the memory 138, which preferably has a direct access memory (RAM; RAM=Random Access Memory). Using the detection signal in the link 140, the FSK detector 128 signals to the controller 136 that an on-hook data transmission signal intended for a subscriber 102 has been detected in the data line 122. The controller 136 then signals to the subscriber line interface circuit 106 via the link 140 that the FSK detector 128 has detected an on-hook data transmission signal, and it switches the subscriber line interface circuit 106 to the active operating mode in order to allow forwarding of the buffer-stored on-hook data transmission signal. When the subscriber line interface circuit 106 has been switched to the active operating mode, the controller 136 controls the FSK transmitter 130 via the link 142 so as to read the on-hook data transmission signal buffer-stored in the memory 138 from the memory 138 via the link 146. When the subscriber line interface circuit 106 is switched to the active operating mode, transient processes lasting approximately 50 ms typically occur. The end of these transient processes is preferably awaited by the controller 136 before the FSK transmitter 130 is actuated to transmit the on-hook data transmission signals. When the on-hook transmission signal has been read from the memory 138 to the FSK transmitter 130, it is transmitted by the FSK transmitter 130 to the digital/analog converter 124 so as to be converted therein into an analog reception signal or on-hook data transmission signal. When the buffer-stored on-hook data transmission signal has been transmitted to the subscriber line interface circuit 106 and if no further on-hook data transmission signals to be transmitted are stored in the memory 138 and/or are detected by the FSK detector 128, the controller 136 switches the subscriber line interface circuit 106 back to the passive operating mode in order to reduce the power loss in the subscriber line interface circuit 106.

A PCM channel in the data line is used to receive 8-bit PCM words, for example, with a spacing of 125 μs (8 kHz). If such a sequence needs to be buffer-stored, a storage space of 800 bytes is required for a period of 100 ms. The PCM words then need to be PCM decoded and FSK decoded and transmitted with a time delay of 100 ms, for example.

In one alternative exemplary embodiment of the circuit arrangement in accordance with the invention, the FSK detector 128 is therefore used not just to detect on-hook data transmission signals in the form of FSK-modulated digital reception signals in the data line 122 or in the data reception line 126, but also to decode the FSK-modulated digital reception signals. Accordingly, in this exemplary embodiment, the FSK transmitter 130 is also used to recode or to modulate the buffer-stored decoded reception signals.

One advantage of this alternative exemplary embodiment is that buffer-storing on-hook data transmission signals requires much less storage space, since FSK decoding and PCM decoding are performed before buffer-storage. With a data transmission rate of 1200 bauds, 120 bits are transmitted in a period of 100 ms, for example. These contain a start bit, a stop bit and an 8-bit data word. Since, in the case of the alternative exemplary embodiment of the circuit arrangement, only the data word needs to be buffer-stored, only a storage space of 12 bytes is required.

Figure 2:
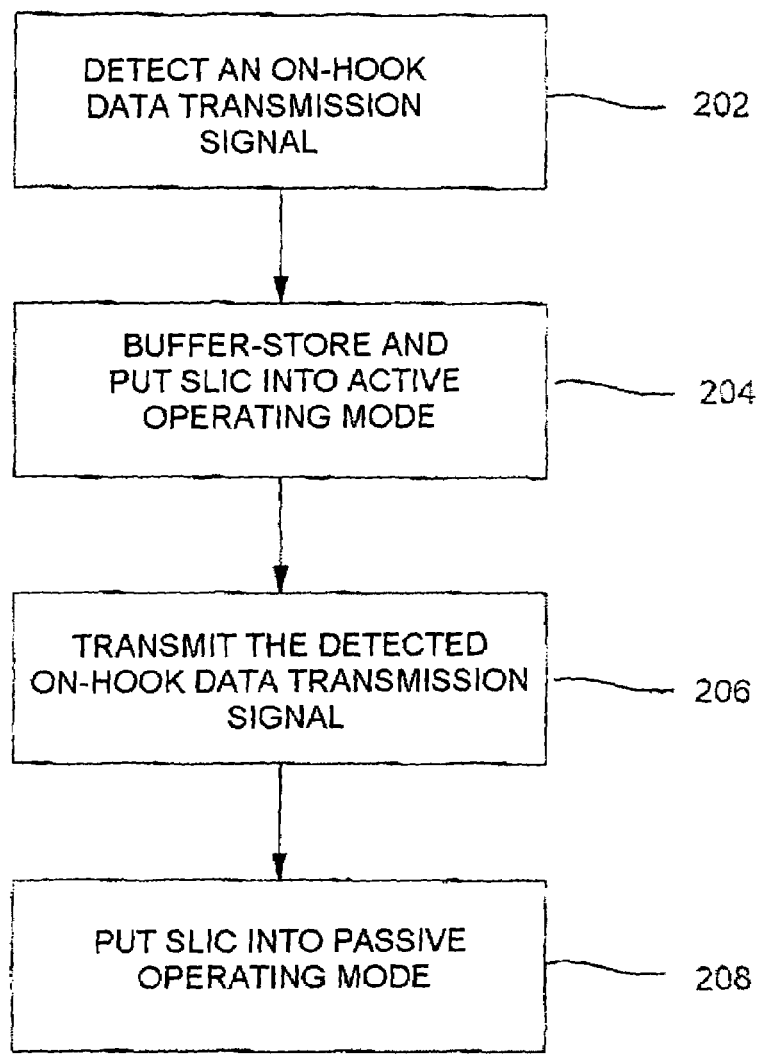
FIG. 2 shows an exemplary embodiment of a method for controlling a subscriber line interface circuit in accordance with the invention.

FIG. 2 shows an exemplary embodiment of a method for controlling a subscriber line interface circuit in accordance with the invention. In this case, the subscriber line interface circuit is preferably connected to at least one data line and to at least one subscriber line and is operated in the on-hook state. In a first step 202 of the method, the data line is monitored, or on-hook data transmission signals are detected in the data line. In the case of an alternative exemplary embodiment of the method, the first step 202 involves the detected on-hook data transmission signals also being decoded. If an on-hook data transmission signal intended for a subscriber is detected or identified in the data line, a second step 204 of the method involves this on-hook data transmission signal being temporarily stored or buffer-stored, and the subscriber line interface circuit is switched from a passive operating mode to an active operating mode. The on-hook data transmission signal is preferably buffer-stored until the subscriber line interface circuit has stabilized. This typically takes approximately 50 ms. In a third step 206 of the method, stabilization of the subscriber line interface circuit is followed by the buffer-stored on-hook data transmission signal being transmitted to the subscriber by the subscriber line interface circuit in the subscriber line. In a fourth step 208 of the method, transmission of the buffer-stored on-hook data transmission signal to the subscriber is followed by the subscriber line interface circuit being reset to the passive on-hook operating mode if no further on-hook data transmission signals are buffer stored or are detected.

Although the present invention has been described above with reference to preferred exemplary embodiments, it is not limited thereto, but rather can be modified in a wide variety of ways.

The method can be implemented, by way of example, in a controller for controlling a subscriber line interface circuit which is preferably in the form of a digital signal processor. The method can be used generally as a hard-wired or software-implemented method for controlling subscriber line interface circuits. The application of the present invention can be implemented in the applicant's GEIMAX (Global Enhanced Multiport Integrated ADSL transceiver) chipsets, for example.

LIST OF REFERENCES

102 Subscriber
104 Subscriber line
106 Subscriber line interface circuit
108 CODEC circuit
110 Transmission line
112 Reception line
114 Control line
116 Analog/digital converter
118 Data transmission line
120 Access
122 Data line
124 Digital/analog converter
126 Data reception line
130 FSK transmitter
132 Link
134 Link
136 Controller
138 Memory
140 Link
142 Link
144 Link
146 Link

What is claimed is:

1. A method for controlling a subscriber line interface circuit, which is connected to at least one data line and to at least one subscriber line associated with a subscriber, in an on-hook state, the method comprising:
(a) detecting on-hook data transmission signals in the data line;
(b) in response to detecting an on-hook data transmission signal intended for the subscriber in the data line, buffer-storing the detected on-hook data transmission signal and switching the subscriber line interface circuit from a passive operating mode to an active operating mode;
(c) in the on-hook state, transmitting to the subscriber the buffer-stored detected on-hook data transmission signal by the subscriber line interface circuit in the subscriber line; and (d) switching the subscriber line interface circuit to the passive operating mode.

2. The method as claimed in claim 1, wherein the passive operating mode is an operating mode in which the subscriber line interface circuit is off.

3. The method as claimed in claim 1, buffer-storing the detected on-hook data transmission signal until the subscriber line interface circuit has stabilized after being switched from the passive operating mode to the active operating mode.

4. The method as claimed in claim 1, wherein the step of detecting on-hook data transmission signals in the data line comprises decoding the on-hook data transmission signals, and the step of transmitting comprises coding the buffer-stored detected on-hook data transmission signal.

5. A circuit arrangement for controlling a subscriber line interface circuit, which is connected to at least one data line and to at least one subscriber line associated with a subscriber, in an on-hook state, the circuit arrangement comprising:
(a) a memory;
(b) a detector for detecting on-hook data transmission signals in the data line and, in response to detecting an on-hook data transmission signal intended for the subscriber in the data line, for buffer-storing the detected on-hook data transmission signal in the memory; and
(c) a controller for switching the subscriber line interface circuit from a passive operating mode to an active operating mode while in the on-hook state in response to the detector detecting an on-hook data transmission signal intended for a subscriber in the data line, and for switching the subscriber line interface circuit from the active operating mode to the passive operating mode while in the on-hook state in response to the buffer-stored detected on-hook data transmission signal being transmitted by the subscriber line interface circuit in the subscriber line to the subscriber.

6. The circuit arrangement as claimed in claim 5, wherein the circuit arrangement additionally has a transmitter which, under the control of the controller, reads the buffer-stored on-hook data transmission signal from the memory and transmits it to the subscriber line interface circuit.

7. The circuit arrangement as claimed in claim 6, wherein the detector decodes detected on-hook data transmission signals before buffer-storage, and wherein the transmitter codes a buffer-stored on-hook data transmission signal before transmission.

8. The circuit arrangement as claimed in claim 6, wherein the detector is an FSK (Frequency Shift Keying) detector, and the transmitter is an FSK transmitter.

9. The circuit arrangement as claimed in claim 5, wherein the memory has a direct access memory (RAM; RAM=Random Access Memory).

10. The circuit arrangement as claimed in claim 5, wherein the circuit arrangement is arranged in a coder/decoder circuit which connects the data line to the subscriber line interface circuit.

11. The circuit arrangement as claimed in claim 5, wherein the passive operating mode is an operating mode in which the subscriber line interface circuit is off.

12. The circuit arrangement as claimed in claim 5, wherein the detected on-hook data transmission signal is buffer-stored until the subscriber line interface circuit has stabilized after being switched from the passive operating mode to the active operating mode.

13. A method for controlling a subscriber line interface circuit, which is connected to at least one data line and to at least one subscriber line associated with a subscriber, in an on-hook state, the method comprising:
 (a) detecting on-hook data transmission signals in the data line;
 (b) in response to detecting an on-hook data transmission signal intended for the subscriber in the data line, buffer-storing the detected on-hook data transmission signal and switching the subscriber line interface circuit from a passive operating mode to an active operating mode;
 (c) in the on-hook state, transmitting to the subscriber the buffer-stored detected on-hook data transmission signal by the subscriber line interface circuit in the subscriber line; and
 (d) switching the subscriber line interface circuit to the passive operating mode, when the buffer-stored on-hook data transmission signal has been transmitted and no further on-hook data transmission signals to be transmitted are stored and/or are detected.

* * * * *